A. Raphin.
Crank Paddle.

No. 53,762.  Patented Apr. 3, 1860.

Witnesses:

Inventor:

UNITED STATES PATENT OFFICE.

AMBROISE RAPHIN, OF PARIS, FRANCE.

IMPROVED PROPELLER FOR VESSELS.

Specification forming part of Letters Patent No. 53,762, dated April 3, 1866.

*To all whom it may concern:*

Be it known that I, AMBROISE RAPHIN, of Paris, in the Empire of France, have invented a new and Improved Propeller; and I do hereby declare that the following is a full, clear, and exact description of the same, reference being had to the accompanying drawings, forming part of this specification, in which—

Figure 1:
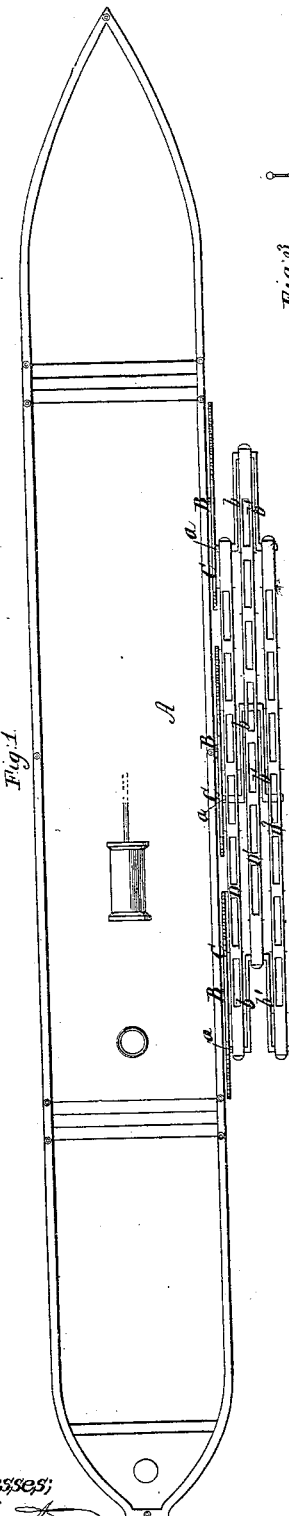
Figure 3:
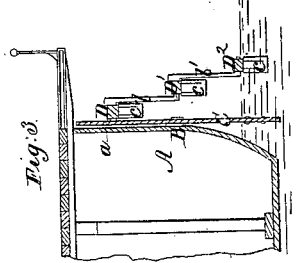
Figure 4:
Figure 2:
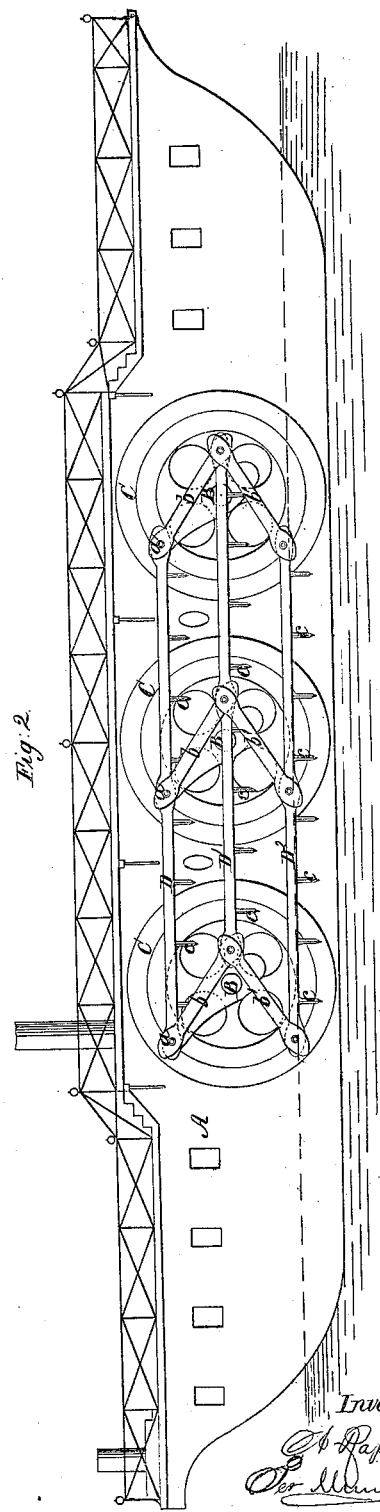

Figure 1 represents a plan or top view of this invention. Fig. 2 is a side elevation of the same. Fig. 3 is a transverse section of the same. Fig. 4 is a detached plan of one of the buckets.

Similar letters of reference indicate like parts.

This invention relates to a propeller which is composed of a series of parallel rods, one of which is secured to eccentric wrist-pins secured in suitable fly-wheels, and which are secured to each other by suitable links, in combination with buckets attached to said parallel rods in such a manner that by revolving the fly-wheels an eccentric revolving motion is imparted to the parallel rods with the buckets, and by the action of said buckets on the water the vessel is propelled. The fly-wheels which carry the eccentric wrist-pins are so arranged in relation to the rods and buckets and to the keel of the vessel that the same will strike bottom first when the vessel comes in shallow water, thus allowing said vessel to move on the wheels and preserving the vessel and the buckets from injury.

A represents the hull of a vessel which supports the bearings for two or more shafts, B, on which are mounted the fly-wheels, C. Each of these wheels is provided with an eccentric wrist-pin, $a$, and the several wrist-pins are connected by a rod, D, which is attached to the same, so that the wrist-pins can turn freely in the same. The rod D connects by means of links $b$ with another rod, D', and the rod D' connects by links $b'$ with a third rod, $D^2$, so that the several rods D D' $D^2$ are parallel to each other, and compelled to assume an eccentric revolving motion by the action of the crank-pins $a'$ as soon as the wheels C are turned. Each of the parallel rods D D' $D^2$ is armed with a series of buckets, $c$, a plan or horizontal section of which is shown in Fig. 4.

By the peculiar position of the parallel rods in relation to each other and to the fly-wheels C the buckets $c$ are drawn through the water, and one set of buckets is continually in operation, so that the vessel is propelled with a powerful action. The buckets dip into the water and rise therefrom in a perpendicular direction, or nearly so, so that no power is wasted; and motion is imparted to one of the shafts B by a steam-engine or other suitable motor from the interior of the vessel.

If desired, the fly-wheels C, with the parallel rods, may be placed in a suitable recess, or well in the center of the vessel, so that injury to the buckets or other parts of the propelling mechanism from collision with other vessels, or from other causes, is prevented.

The diameter of the fly-wheels C is such that their rims project somewhat below the keel of the vessel and below the buckets when the same have arrived in their lowest position, so that if the vessel runs in shallow water it will be supported by the fly-wheels, which in that case will act similar to the wheels on a wagon or locomotive, and by these means the vessel will be enabled to pass over sand-banks, reefs, or other shallow places without sustaining any injury in its hull or propelling apparatus.

What I claim as new, and desire to secure by Letters Patent, is—

The fly-wheels C, mounted on two or more shafts, B, secured to the hull of a vessel, in combination with two or more parallel rods, D, and buckets $c$, all constructed and operating substantially as and for the purpose described.

AMBROISE RAPHIN.

Witnesses:
 DEMOS,
 AG. GUION.